UNITED STATES PATENT OFFICE.

HENRY E. POND, OF FRANKLIN, ASSIGNOR TO WILLIAM E. GEORGE, OF WRENTHAM, MASSACHUSETTS.

IMPROVEMENT IN SIZING FOR HATS, &c.

Specification forming part of Letters Patent No. 40,886, dated December 8, 1863.

*To all whom it may concern:*

Be it known that I, HENRY E. POND, a resident of Franklin, in the county of Norfolk and State of Massachusetts, have invented a new or Improved Mode of Making Sizing for Stiffening Fabrics to be Stamped or Molded by Heated Dies or Molds; and I do hereby declare the same to be fully described in the following specification.

My invention is specially useful on felt, palm-leaf, or fabric after having been made up into a hat-body, such as is to be formed or shaped by heated molds or dies, as my preparation or composition, while it will insure the requisite stiffness to the body of a hat after being acted on by the heated dies, will prevent the hat-body from adhering to the dies.

Heretofore it has been customary to employ for such purposes an alcoholic solution of shellac; but this has its disadvantages, and, besides, cannot be used with the economy which is incident to my solution.

Although I employ gum-arabic, alcohol, and water in manufacturing my preparation, I wish it distinctly understood that I lay no claim to them merely in combination, as a hydro-alcoholic solution of any well-known gum, I presume is not new.

I have discovered when gum-arabic is dissolved in a hydro-alcoholic solution in which the proportion of water to alcohol is four quarts of water to one of alcohol, that after standing a while a white creamy matter will rise in the solution and gather and float on its top surface. I have also found that this creamy matter is of great advantage in the solution when the latter is used in stiffening hats or fabrics which are to be subjected to the action of hot molds or dies, as when it is in the solution the articles treated are stiffer, and in various other respects better, than when the solution is used without such creamy matter, as this creamy matter will separate from the solution when made of four quarts of water, one quart of proof alcohol, and one and one-half pounds of gum-arabic. I have discovered, by combining with the said solution, after it may have been properly made, another quart of water, that a reincorporation of the creamy matter with the solution will at once take place. I have also found, by repeated experiments, that even when the alcohol and water were combined in the proportion of one quart of alcohol to five quarts of water the gum my solution made with such and gum-arabic would still be attended with a separation of the creamy matter.

Some chemical or other change or action follows the addition of water to the solution, which not only restores the creamy matter to the solution, but prevents it from separating therefrom and rising and floating on it. It is this reapplication of water in, or about in, the proportion herein stated to the hydro-alcoholic solution of gum-arabic, made in, or about in, the proportions as explained that constitutes a material point in my invention.

In making my sizing preparation, to four quarts of cold water one and one-half pounds of gum-arabic are to be added, and after the gum may have been thoroughly dissolved in the water the solution should be strained or filtered, and afterward have a quart of proof alcohol added to it. It should next be well stirred, and subsequently be suffered to rest for about two hours, after which one quart of water should be added to and well stirred into it. The solution will then be ready for use.

A fabric after having been sized with the solution should be suffered to dry. Previous to being pressed or stamped it should be rolled in wet cloths, or be steamed, so as to dampen the size.

With my preparation for sizing fabrics they not only can be stamped evenly and faster and with a better finish, but will be cleaner, and retain their color to more advantage than they will with any of the other kinds of sizing as heretofore usually employed.

What I claim as my invention, is—

The above-described improvement in making the hydro-alcoholic solution of gum, for the purpose specified.

HENRY E. POND.

Witnesses:
R. H. EDDY,
F. P. HALE, Jr.